United States Patent [19]

Green

[11] 3,946,618

[45] Mar. 30, 1976

[54] BULL WHEEL

[75] Inventor: Lane A. Green, Longview, Tex.

[73] Assignee: Superior Iron Works & Supply Company, Inc., Shreveport, La.

[22] Filed: Oct. 9, 1973

[21] Appl. No.: 399,082

[52] U.S. Cl. .............................. 74/230.5; 74/230.7
[51] Int. Cl.² .................... F16H 55/36; F16H 55/48
[58] Field of Search ............ 74/230.7, 230.9, 230.8, 74/230.3, 230.05, 230.01, 230.11, 230.12, 230.13, 230.14, 448, 230.5; 29/159 R

[56] References Cited
UNITED STATES PATENTS

| 771,879 | 10/1904 | Marsh | 74/230.7 |
|---|---|---|---|
| 1,017,553 | 2/1912 | Jones | 74/230.5 |
| 1,099,736 | 6/1914 | Campbell | 74/230.9 |
| 1,231,856 | 7/1917 | Crane | 74/230.5 |
| 1,287,519 | 12/1918 | Thomson | 74/230.7 |
| 1,306,792 | 6/1919 | Woodworth | 74/230.9 |
| 1,499,500 | 1/1924 | Bloss | 74/230.9 |
| 2,806,380 | 9/1957 | Martin | 74/230.7 |
| 2,954,702 | 10/1960 | Petersen | 74/230.7 |
| 3,439,883 | 4/1969 | Peterson | 74/230.9 |
| 3,494,212 | 2/1970 | Thomson | 74/230.7 |
| 3,772,928 | 11/1973 | Gobeille | 74/230.7 |

FOREIGN PATENTS OR APPLICATIONS

| 301,719 | 10/1932 | Italy | 74/230.7 |

Primary Examiner—Samuel Scott
Assistant Examiner—A. Russell Burke
Attorney, Agent, or Firm—Hubbard, Thurman, Turner & Tucker

[57] ABSTRACT

A bull wheel is disclosed for applying a tensioning or retarding force to cable. The bull wheel has a center drum having a peripheral rim. A series of groove defining segments of resilient material are detachably secured to the rim to form the traction wheel for convenient assembly and repair. In one embodiment the segments are curved and define a single groove. In another embodiment the segments are flat and define multiple grooves and are wrapped at assembly to conform to the curvature of the bull wheel rim.

5 Claims, 9 Drawing Figures

BULL WHEEL

This invention relates to a cable wheel assembly and more particularly relates to the type of cable wheel known as a bull wheel for installing power transmission cables.

Hoisting machinery and apparatus often utilize rotating drums in association with cable hoisting apparatus. The cables are wound around the drums intermediate the load and the take-up device. The drums serve to apply a retarding force and regulate the tension applied to the cable. An example of such cable drums are the bull wheels used in cable stringing devices for installation of electrical conductors.

In conventional cable tensioning machines, the cable is paid out from a supply reel and is directed around one or more bull wheels. Caliper type disk brakes may be utilized to control the rotation of the bull wheel, and thereby regulate the tension that is applied to the cable. The bull wheels serve to frictionally engage the cable and increase or multiply the effective retardation force applied to the cable. Payout wheels may be variously constructed. It is well known, for example, to provide a payout wheel with multiple grooves in the periphery to permit multiple wrappings of the cable to increase the frictional force and consequently the tension applied during installation or removal of electrical cable. The same apparatus may be used for rewinding or taking up the transmission cables if it is desired to remove the cables from the towers. Generally, multiple groove bull wheels are paired with the cable being wrapped around several successive wheels for increased friction.

The frictional retarding force applied to electrical conductors and other cables may be applied by a bull wheel having a single groove in the periphery. As is the case with the multiple groove bull wheel, the cable is partially wound about the bull wheel to increase the frictional force applied to the cable during installation or removal of cable. The peripheral groove in the single groove bull wheel is generally V-shaped in cross section. The V-shaped groove tends to engage a greater surface area of the cable and therefore apply greater frictional force in a single wrap of the wheel. Further, less bending of the cable occurs since the cable is not wound in multiple wraps around the bull wheel and the possibility of damage to the cable is reduced. A typical example of a single groove bull wheel may be found in U.S. Pat. No. 3,317,149.

In the prior art, construction of both the single and multiple groove bull wheels require a series of fabrication steps. Similarly, repairs to a damaged bull wheel are also difficult and time consuming. Generally, multiple groove bull wheels are formed by fabricating a cylindrical drum having an annular metal rim. A series of circular grooves are provided in the surface of the metal rim. The grooved rim is generally provided with a bonded coating of a material with a suitable coefficient of friction such as rubber to form the traction or friction wheel. The high compressive loads applied to multiple groove bull wheels often cause damage to the grooved rim. To repair damaged rims, the rim has to be unbolted from the drum and the entire rim replaced. This procedure can be costly and inefficient, as the metal rim is discarded, having no further use.

In the instance of single groove bull wheels, it is conventional to form the traction wheel by bonding an annular ring of resilient material between two side plates of the drum. Generally, the drum is first constructed and the annular ring of resilient material must be adhesively joined or bonded to the drum in a separate fabrication step. This may require sending the wheel to a separate specialty shop. Once the resilient material is joined to the drum, the material must be properly cured, and once cured, returned to the original fabricator for machining the V-groove in the ring of resilient material. In many instances, the series of steps required in the fabrication of the bull wheel require as many as from three to four months to perform. In case of damage to the resilient rim of the bull wheel, it is necessary to return the entire bull wheel assembly to the manufacturer for replacement of the resilient ring and machining of the V-groove in the manner outlined above. Obviously, repairs of this nature consume an inordinate amount of time and construction delays can result in a substantial financial hardship to a contractor.

The present invention proudly relates to an improved construction for bull wheels which overcomes the disadvantages cited above. In accordance with the broader aspects of the present invention, a bull wheel is provided in which the peripheral traction wheel comprises a series of segments of a suitable resilient material, each section being detachably secured to the drum structure. At the time of fabrication, the traction wheel segments are secured in place to the drum by bolts or other similar mechanical fasteners. If repairs are needed, the individual sections may be removed and easily and conveniently replaced by new sections.

In accordance with one embodiment of the present invention, a single groove bull wheel is provided having opposite circular side plates secured together forming the drum. The traction wheel is formed by a series of segments of a resilient material having suitable frictional characteristics bolted to the drum. The segments are molded and configured having a V-groove configuration to accommodate the cable. The material of the segments may be rubber, neoprene or preferably, polyurethane.

In accordance with another embodiment of the present invention, the bull wheel comprises a drum portion having a flat annular lip extending around the circumference of the wheel. The traction wheel comprises a series of segments of a resilient material having multiple, parallel generally U-shaped grooves in the outer surface. The inner surface of the strips are provided with a series of aligned transversely extending bearing members integrally molded into the strips. The bearing members support fasteners which are adapted to the segments to the rim of the drum. The segments are molded in a flat condition and may be formed at installation to the desired curvature. In this way, a single traction wheel segment can be applied to various diameter bull wheels.

A more complete understanding of the present invention may be had by referring to the following detailed description when taken into conjunction with the accompanying drawings, wherein.

Figure 1:
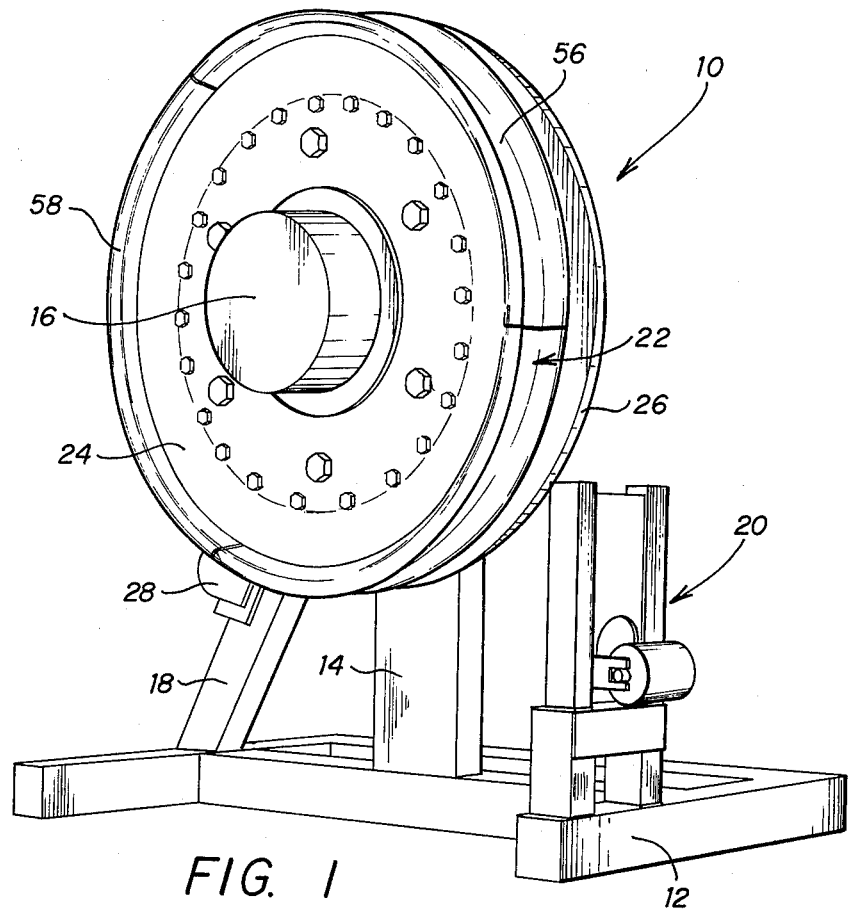
FIG. 1 is a perspective view of a typical cable stringing device having a single groove bull wheel.
Figure 2:
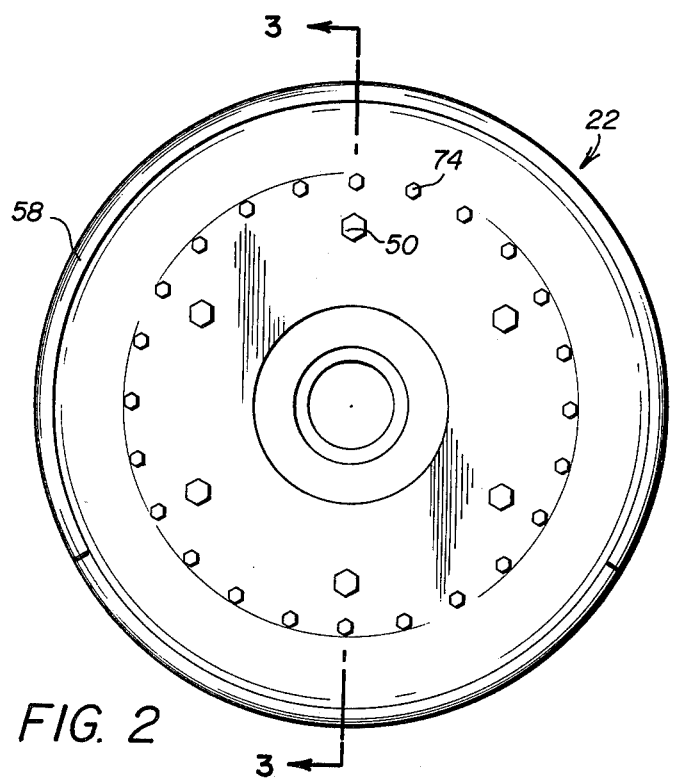
FIG. 2 is a side view of the bull wheel of the apparatus shown in FIG. 1.

Referring now to the drawings, particularly FIG. 1, the cable stringing device is generally designated by the numeral 10. Cable stringing device 10 includes a platform 12 supporting vertical post 14 which is reinforced by diagonal brace member 18. Post 14 carries a suitable axle and hub bearing assembly 16 for rotationally supporting the bull wheel assembly 22. A fairlead assembly 20 is mounted on the front of platform 12 having suitable rollers for guiding cable to maintain alignment of the cable between the reel and bull wheel. Bull wheel assembly 22 generally includes a drum 24 having a circular flat disk plate 26 attached to the inner side of the drum and arranged in parallel relationship with the drum 24. Disk plate 26 serves as a braking surface against which the calipers of hydraulically actuated braking device 28 engages to slow or stop the rotation of the drum as is conventional.

When cable is installed, a reel of suitable cable is rotatively mounted adjacent the cable stringing device 10. The cable is fed through the fairlead 20 and wrapped around the periphery of the drum 24, engaging the periphery for about 180° of the circumference with the take-off point being at the top portion of the bull wheel 22. A suitable pulling rope of nonconductive material is attached to the cable end and is strung over the towers or poles and is connected to a remotely located pulling reel. The pulling reel is actuated to wind the pulling rope on a drum. To regulate the tension applied to the cable as it is unwound, hydraulic braking device 28 is actuated periodically by the operator. The frictional engagement between the cable and the periphery and the bull wheel 22, serves to, in effect, multiply or increase the retarding force applied in the wire stringing device.

Alternatively, the wire stringing device 10 can be used to wind cable on a reel in a situation where it is desired to take down the cable. In such a situation, disk 26 is replaced with a large sprocket or gear. The bull wheel and the adjacent take-up reel are positively driven in a rotative direction to wind in the cable.

Although the present invention relates only to the construction of the bull wheel, the foregoing general description of the operation cable stringing devices is set forth to facilitate a full understanding of the present invention. It should be also noted that although the construction of the bull wheel of the present invention has been described specifically with reference to a cable stringing device, the construction has wide applicability to various hoisting devices such as winches, hoists and other tensioning or retardation devices where a flexible cable or hoisting members is wound around a drum to apply a uniform resisting or tensioning force to the cable.

The construction of bull wheel 22 will be more fully appreciated from reference to FIGS. 2 through 5. Drum 24 is comprised of opposite side plates 30 and 32. Side plate 30 is provided with a flat center portion 34 and an annular rim portion 36. Plate 32 is of similar construction and here and throughout the description, identical numerals with an appended "a" are used to identify the same or similar elements. Rim portion 36 includes an angular flange 38 terminating at a peripheral lip 40. It will be seen that when opposite side plates 30 and 32 are assembled to form the drum, a peripheral V-shaped space converging toward the radial centerline is defined between the opposite rims 36 and 36a of the side plates.

Figure 3:
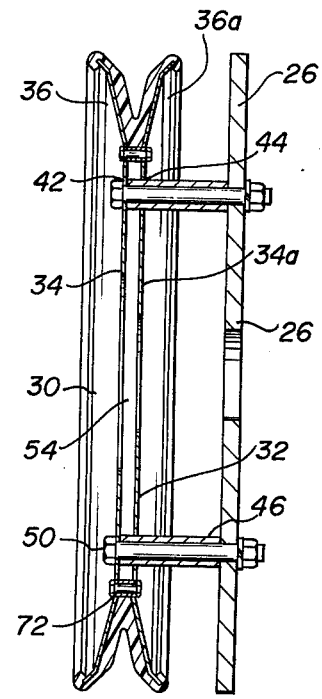
FIG. 3 is a sectional view taken along lines 3—3 of of FIG. 2.

A series of bolt holes 42 are arranged on a bolt circle on flat portions 34 of side plate 30. An aligned series of larger spacer holes 44 are provided in side plate 32. When the side plates 30 and 32 are assembled as seen in FIG. 3, tubular spacers 46 are received in holes 44 with the inner end of spacers 46 abutting the inside of plate 30. Spacers 46 are peripherally welded to the interior of plate 30 and to the exterior of plate 32. The bore of spacers 46 align with bolt holes 42 in plate 30. Disk 26 is secured in parallel relationship to the drum at the outer end of spacers 44 by bolts 50, extending through the spacers. As explained above, disk 26 serves as a part of the braking device for the bull wheel. Alternately, disk 26 can be replaced with a large sprocket for positively driving the bull wheel when it is desired to utilize the bull wheel in a take-up mode of operation.

Figure 4:
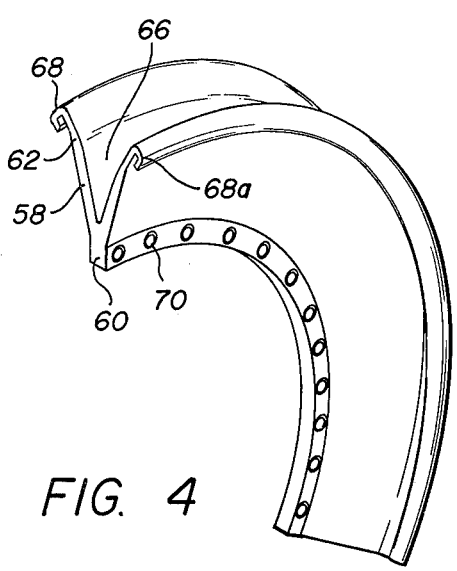
FIG. 4 is a detailed perspective view of a single segment of the traction wheel.
Figure 5:
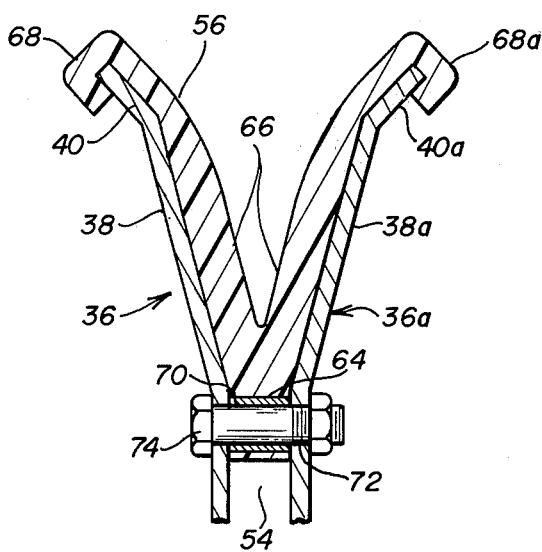
FIG. 5 is an enlarged partial sectional view of a portion of the rim of the bull wheel.
Figure 7:
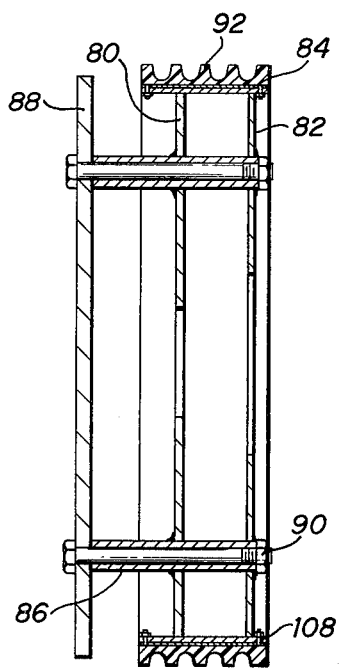
FIG. 7 is a sectional view taken along lines 7—7 of FIG. 6.
Figure 6:
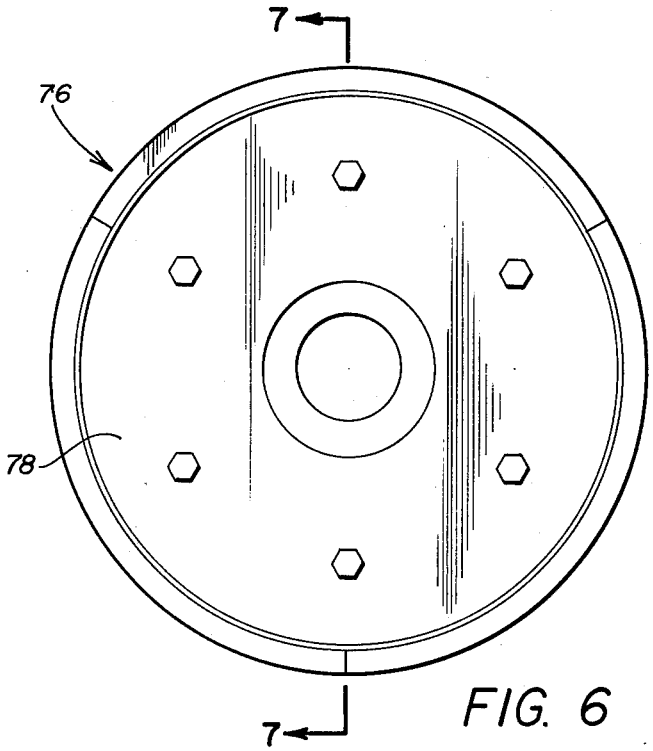
FIG. 6 is a side view of another embodiment of the bull wheel of the present invention.
Figure 9:
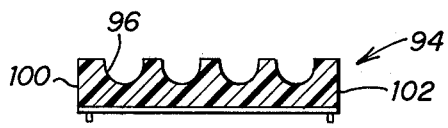
FIG. 9 is a sectional view taken along lines 9-9 of FIG. 8.
Figure 8:
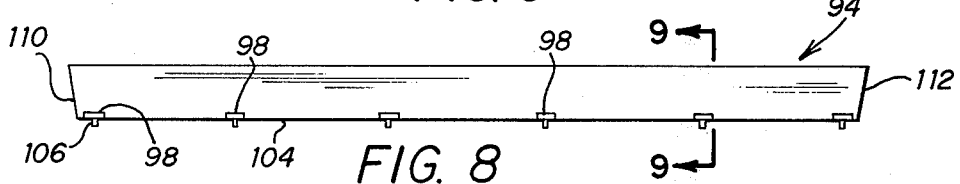
FIG. 8 is a side view of a segment of the multiple groove traction wheel utilized in the embodiment shown in FIG. 6.

As best seen in FIG. 5, when the bull wheel is assembled, a peripheral generally V-shaped space is formed between the rim sections 36 and 36a of the opposite side plates. A lateral clearance 54 is defined between the opposite parallel side plate 30 and 32. The peripheral traction wheel 56 fits between the opposite side plates at the rim of the wheel. The traction wheel 56 is comprised of a series of individual curved segments 58. Each of the segments 58, as best seen in FIGS. 4 and 5, is in the general cross sectional shape of a Y having an intermediate leg 60 and two outwardly diverging arm portions 62 and 62a which between them, define a V-groove 66 which converges towards the radial centerline of the bull wheel. Preferably, the outer ends of arms 62 and 64 are reversely bent in a lip 68 and 68a. Each of the leg portions 60 of the segments carry a number of laterally extending holes 70 which receive a tubular metal insert 64.

The holes 70 align with corresponding holes 72 in the opposite side plates. To install traction wheel 56, the appropriate number of segments 58 are positioned between the opposite side plates until the traction wheel is completed around the periphery of the wheel. The segments are held in place by securing them with high strength bolts 74 extending between the side plates 30 and 32 and through the aligned inserts 64. The U-shaped lips 68 at the periphery of the segments are engaged over the circumferential edges 40 and 40a of the plate to minimize slippage between the segments and the side plates.

Preferably, the material of construction of the individual segments 58 is a resilient material having sufficient hardness to provide the desired wear characteristics and sufficient coefficient friction. Typically, the material can be a rubber or neoprene. Polyurethane has been found to be particularly suitable for this purpose. The individual segments are fabricated by conventional molding techniques. Preferably, the individual segments 58 are fabricated in several sizes with the radius of curvature of the segments being sized and adapted to fit conventional standard size bull wheels.

Should the traction wheel or a portion of the traction wheel become damaged or should replacement of the traction wheel become necessary for other reasons, this can be easily and expediently done. Bolts 74 extending through the segments to be replaced can simply be removed and the old segments removed and discarded. New segments 58 are placed in position between the opposite side plates 30 and 32 at the appropriate location and secured by bolts 74. There is no need to remove the bull wheel from the machine and return it to the fabricator for bonding of a new resilient traction wheel around the periphery of the bull wheel. Further, there is no need for a machining operation to place the groove in the periphery of the traction reel. Downtime of the machine is minimized. Only a short period is necessary to replace the segments of the bull wheel which can be conveniently done in a field operation. The contractor can conveniently stock replacement segments and have them on hand should replacement become necessary.

FIGS. 6 to 9 show another embodiment of the bull wheel of the present invention. In this embodiment generally designated by the numeral 76, the bull wheel 78 is of the type known as a multiple groove wheel. Generally, multiple groove wheels are functionally similar to the single groove wheels but are usually paired or arranged in a cooperative relationship. Bull wheel 78 is preferably of welded construction having parallel spaced apart side plates 80 and 82 carrying a peripheral flange or rim 84. The rims are spaced apart to accommodate the tensioning loads imposed. Plate 80 is preferably of increased thickness and located relative to the rim 84 to support the imposed loads. Axially extending spacers 86 are symmetrically arranged around the rotational axis of the bull wheel and mount brake disk 88 by means of high-tension bolts 90.

Traction wheel 92 extends around the periphery of rim 84 and is comprised of a series of individual segments 94. Each of the segments 94 has a predetermined number of parallel spaced apart U-shaped grooves 96 in the outer surface. The material of the individual segments is a suitable resilient material having required hardness and frictional characteristics, such as rubber, neoprene or polyurethane and the individual segments are formed in a molding process.

Integrally formed in each of the segments is a series of spaced apart transversely extending bearing plates 98 which extend from one edge 100 to the opposite edge 102 of the individual segments. Each of the bearing plates carries threaded fasteners 106 depending downwardly from the bottom surface 104 of the segments adjacent the edges of the segments. Threaded fastener members 106 align with holes 108 provided adjacent the opposite edges of rim 84 of bull wheel 78.

It will be seen that the traction wheel can easily be secured to the inner drum portion of the bull wheel by simply placing the resilient segments 94 around rim 84 with the fasteners 106 extending through the appropriate holes 108. The fasteners are secured in place by placing nuts around the end of the fasteners and tightening the nuts down against the innerside of rim 84. This will cause the flat segments 94 to bend or wrap to conform to the shape of the curvature of the outer rim 84. Preferably, the opposite ends of the individual segments 58 are slightly beveled at 110 and 112. In this way, when the abutting ends of adjacent segments 94 are secured in place, little or no gap will occur between the individual segments around the periphery of the rim.

It is preferred that the individual segments be stocked or inventoried in one or several standard lengths. The length of the segments can be standardized so that a predetermined number of the individual segments will be accommodated on the various conventional size bull wheels used in the industry. In this way, it is not necessary for a contractor to inventory various lengths of the segments for the various size bull wheels that may be used. For example, a four-groove 26 inch diameter bull wheel may be completely peripherally covered by two segments of appropriate 40 inches length whereas a 38 inch four-groove bull wheel may require three segments of the same length.

The segments may be provided in any varying width and with any number of grooves as required. Also, the shape of the grooves may be U-shaped as shown or may be provided in a V-shape or other shape to provide the frictional characteristics required.

Thus, it will be seen that the present invention provides a novel and new construction for a tension increasing device such as a bull wheel. The outer peripheral traction wheel portion of the bull wheel is comprised of a plurality of resilient segments which can be detachably secured to the bull wheel. The segments may be flat and wrapped to fit the bull wheel at the time of placement or may be provided in a curve shape conforming to the curvature of the bull wheel. Installation of the segments requires only a minimum amount of time with the flexible segments being held in place by mechanical fasteners. The individual segments can be provided in a wide variety of configurations having single or multiple grooves and with various shaped grooves such as U-shape or V-shape.

It will be obvious to those skilled in the art to make various other changes, modifications and alterations to the invention herein described. To the extent that those changes, alterations and modifications do not part from the spirit and scope of the present invention, they are intended to be included herein.

What is claimed is:

1. A segment of a traction wheel adapted for attachment between rims of a drum arranged in a generally V-shaped peripheral configuration, said segment comprising:
   a unitary body member having two arms defining a groove therebetween, said arms having a generally U-shaped lip integral therewith at the terminal end of said arms adapted to engage the periphery of such a rim and converging in a generally V-shape having a flange depending from the area of convergence of the arms; and
   means adapted to detachably secure said body between such a rim whereby a plurality of said segments can be joined in abutting fashion to form a peripheral traction wheel about such a drum.

2. The segment of claim 1 wherein said means adapted to detachably secure said body between the rims comprises hole means in said flange adapted for reception of a mechanical fastener.

3. The segment of claim 1 wherein said segment is of molded construction having a predetermined curvature.

4. A segment of a traction wheel adapted for attachment to a substantially flat circular rim comprising:

a resilient body member having a flat inner surface and an outer surface defining at least one groove therein; and means adapted to engage said rim whereby a plurality of said segments can be joined in abutting fashion to form a peripheral traction wheel about the rim, said means adapted to engage said rim comprising mechanical fasteners projecting from the inner surface of said body, said fasteners being secured to integral mounting plates extending transversely across said segments, and wherein said segments are of predetermined length and the ends of said segments are beveled so as to engage in substantially abutting relationship forming a line of contact substantially perpendicular to said circular rim when formed thereabout, whereby various multiples of segments may be arranged to extend around the periphery of various standard diameter rims.

5. The segment of claim 4 wherein said segments are of molded construction.

* * * * *